(12) United States Patent
Howard

(10) Patent No.: US 10,451,443 B2
(45) Date of Patent: Oct. 22, 2019

(54) INDUCTIVE DISPLACEMENT DETECTOR

(71) Applicants: Mark Anthony Howard, Worlington, Suffolk (GB); Darran Kreit, Cambridge, Cambridgeshire (GB)

(72) Inventor: Mark Anthony Howard, Worlington (GB)

(73) Assignee: ZETTLEX (UK) LIMITED, Cambridgeshire (GB)

( * ) Notice: Subject to any disclaimer, the term of this patent is extended or adjusted under 35 U.S.C. 154(b) by 707 days.

(21) Appl. No.: 14/433,252

(22) PCT Filed: Oct. 2, 2013

(86) PCT No.: PCT/GB2013/052572
§ 371 (c)(1),
(2) Date: Apr. 2, 2015

(87) PCT Pub. No.: WO2014/053836
PCT Pub. Date: Apr. 10, 2014

(65) Prior Publication Data
US 2015/0260549 A1     Sep. 17, 2015

(30) Foreign Application Priority Data

Oct. 2, 2012   (GB) .................................. 1217577.4
May 22, 2013   (GB) .................................. 1309201.0
(Continued)

(51) Int. Cl.
*G01D 5/20*     (2006.01)
*G01D 5/14*     (2006.01)

(52) U.S. Cl.
CPC ........... *G01D 5/2066* (2013.01); *G01D 5/147* (2013.01)

(58) Field of Classification Search
CPC ............................. G01D 5/2066; G01D 5/147
(Continued)

(56) References Cited

U.S. PATENT DOCUMENTS

| | | | |
|---|---|---|---|
| 2005/0265814 A1* | 12/2005 | Coady ..................... | H01L 21/68 414/744.5 |
| 2009/0079422 A1* | 3/2009 | Lee .......................... | G01B 7/003 324/207.16 |
| 2010/0001718 A1* | 1/2010 | Howard ................. | G01B 7/003 324/207.15 |

FOREIGN PATENT DOCUMENTS

| | | | | |
|---|---|---|---|---|
| AU | 431962 B | | 8/1970 | |
| GB | 2462341 A | * | 2/2010 | ............. G01D 5/208 |

OTHER PUBLICATIONS

International Search Report and Written Opinion issued in PCT/GB2013/052572 dated Apr. 8, 2014.

* cited by examiner

*Primary Examiner* — Reena Aurora
(74) *Attorney, Agent, or Firm* — Muncy, Geissler, Olds & Lowe, P.C.; Daniel Podhajny

(57) ABSTRACT

An inductive detector for measuring the position of a first body relative to a second body along a measurement path comprises: a first body which comprises a substantially planar surface and a passive electromagnetic target; a second body which comprises a substantially planar surface facing the planar surface of the first body and an arrangement of laminar windings; said first and second body being configured such that the electromagnetic influence of the first body on the second body varies according to the position of the first body relative to the second body along the measurement path; wherein said passive electro-magnetic target comprises a first portion incorporating said planar surface and a second portion with a lower thickness than said first portion;

(Continued)

whereby the second portion incorporates an insulating aperture.

26 Claims, 11 Drawing Sheets

(30) Foreign Application Priority Data

May 23, 2013 (GB) .................................... 1309276.2
Aug. 9, 2013 (GB) .................................... 1314317.7

(58) Field of Classification Search
USPC .................................................... 324/207.15
See application file for complete search history.

INDUCTIVE DISPLACEMENT DETECTOR

CROSS-REFERENCE TO RELATED APPLICATIONS

This application is the U.S. National Stage Entry under 35 U.S.C. § 371 of International Application No. PCT/GB2013/052572, filed on Oct. 2, 2013, which claims priority to GB Patent Application No. 1217577.4, filed on Oct. 2, 2012, GB Patent Application No. 1309201.0, filed on May 22, 2013, GB Patent Application No. 1309276.2, filed on May 23, 2013, and GB Patent Application No. 1314317.7, filed on Aug. 9, 2013.

FIELD OF THE INVENTION

This invention relates to the construction of an inductive detector, operable to measure the displacement of two relatively moveable bodies.

REVIEW OF THE ART KNOWN TO THE APPLICANT

The authors have previously disclosed various electromagnetic detectors including GB2462341. This teaches an advantageous construction technique which minimizes or eradicates the influence of nearby metal objects which might otherwise distort or influence the performance of the detector. This is achieved by the use of a lamination, such as a printed circuit board and a copper plate, spaced away from the detector's operating elements.

SUMMARY OF THE INVENTION

The invention seeks to simplify the construction and effective operation of an inductive detector where shielding from external electromagnetic fields is desirable for accurate operation. A number of broad independent aspects arise as alternative solutions to improving known inductive detectors of this kind.

In a first broad independent aspect, the invention provides an inductive detector for measuring position of a first body relative to a second body along a measurement path comprising:
  a first body which comprises a substantially planar surface and a passive electromagnetic target;
  a second body which comprises a substantially planar surface facing the planar surface of the first body and an arrangement of laminar windings;
  said first and second body being configured such that the electromagnetic influence of the first body on the second body varies according to the position of the first body relative to the second body along the measurement path; wherein said passive electromagnetic target comprises a first portion incorporating said planar surface and a second portion with a lower thickness than said first portion; whereby the second portion incorporates an insulating aperture.

This configuration is particularly advantageous since it allows the target to be formed from fewer components than in the prior art. In particular embodiments, it may advantageously be formed from a solid piece of material.

In a second broad independent aspect, the invention provides an inductive detector for measuring the position of a first body relative to a second body along a measurement path comprising:
  a first body which comprises a substantially planar surface and a passive electromagnetic target;
  a second body which comprises a substantially planar surface facing the planar surface of the first body and an arrangement of laminar windings;
  said first and second body being configured such that the electromagnetic influence of the first body on the second body varies according to the position of the first body relative to the second body along the measurement path;
  at least one of said first and second bodies incorporating an insulating portion and a shield; wherein the ratio of the thickness of the insulating portion and the radius of either the first or the second body is lower than 1/5.

This configuration is particularly advantageous because it potentially removes the requirement for laterally disposed shields. It allows the detector in certain embodiments to be formed as a laminate of a series of layers disposed as a vertical stack.

In a third broad independent aspect, the invention provides an inductive detector for measuring the position of a first body relative to a second body along a measurement path comprising:
  a first body which comprises a substantially planar surface and a passive electromagnetic target;
  a second body which comprises a substantially planar surface facing the planar surface of the first body and an arrangement of laminar windings;
  said first and second body being configured such that the electromagnetic influence of the first body on the second body varies according to the position of the first body relative to the second body along the measurement path; at least one of said first and second bodies incorporating an insulating portion and a shield; wherein said shield extends solely in a direction orthogonal to the measurement path.

This configuration is particularly advantageous because it removes the requirement for the shield on the lateral portions of the detector and therefore reduces the material required.

In a fourth independent aspect, the invention provides an inductive detector for measuring the position of a first body relative to a second body along a measurement path comprising:
  a first body which comprises a substantially planar surface and a passive electromagnetic target;
  a second body which comprises a substantially planar surface facing the planar surface of the first body and an arrangement of laminar windings;
  said first and second body being configured such that the electromagnetic influence of the first body on the second body varies according to the position of the first body relative to the second body along the measurement path; at least one of said first and second bodies incorporating an insulating portion and a shield; wherein said shield is chemically secured to said insulating portion.

This configuration is particularly advantageous because it avoids a prior art requirement of securing mechanically separate components. Particularly, it avoids the prior art requirement of securing shield plates onto the insulating material by using fasteners.

In a fifth broad independent aspect, the invention provides an inductive detector for measuring the position of a first body relative to a second body along a measurement path comprising:
  a first body which comprises a substantially planar surface and a passive electromagnetic target;

a second body which comprises a substantially planar surface facing the planar surface of the first body and an arrangement of laminar windings;

said first and second body being configured such that the electromagnetic influence of the first body on the second body varies according to the position of the first body relative to the second body along the measurement path; at least one of said first and second bodies incorporates an insulating portion and a shield; wherein said shield incorporates both conductive portions and air gaps between conductive portions.

This configuration is particularly advantageous because it reduces the shielding material content required to cover a particular area of an inductive detector.

In a sixth broad independent aspect, the invention provides an inductive detector for measuring the position of a first body relative to a second body along a measurement path comprising:

a first body which comprises a substantially planar surface and a passive electromagnetic target;

a second body which comprises a substantially planar surface facing the planar surface of the first body and an arrangement of laminar windings;

said first and second body being configured such that the electromagnetic influence of the first body on the second body varies according to the position of the first body relative to the second body along the measurement path; at least one of said first and second bodies incorporating an insulating portion and a shield; wherein said shield is embedded into an outermost portion of said insulating portion.

This configuration is particularly advantageous because it improves the mechanical bond between the shield and the insulating portion. It therefore improves the resistance to mechanical failure.

In a seventh broad independent aspect, the invention provides an inductive detector for measuring the position of a first body relative to a second body along a measurement path comprising:

a first body which comprises a substantially planar surface and a passive electromagnetic target;

a second body which comprises a substantially planar surface facing the planar surface of the first body and an arrangement of laminar windings;

said first and second body being configured such that the electromagnetic influence of the first body on the second body varies according to the position of the first body relative to the second body along the measurement path; at least one of said first and second bodies incorporating an insulating portion and a shield; wherein said shield incorporates an annular portion which projects from one of said bodies and radially covers the gap between the first and second bodies.

This configuration is particularly advantageous since it improves the shielding in the lateral direction as opposed to merely providing shielding in the orthogonal direction.

In an eighth broad independent aspect, the invention provides an inductive detector for measuring the position of a first body relative to a second body along a measurement path comprising:

a first body which comprises a substantially planar surface and a passive electromagnetic target;

a second body which comprises a substantially planar surface facing the planar surface of the first body and an arrangement of laminar windings;

said first and second body being configured such that the electromagnetic influence of the first body on the second body varies according to the position of the first body relative to the second body along the measurement path;

at least one of said first and second bodies incorporating a shield;

said detector being arranged such that the distance orthogonal to the measurement path between the laminar windings and the passive electromagnetic element is less than the distance orthogonal to the measurement path between the windings and the first surface of the shield;

and the distance orthogonal to the measurement path between first and second surfaces of the shield is greater than its electromagnetic skin depth at the detector's operating frequency.

In a subsidiary aspect, the invention provides a first body which is formed as a solid piece of material. This provides a more robust component and simplifies its construction.

In a subsidiary aspect, the ratio of the thickness of the insulating portion and the radius of either the first or second body is lower than 1/5 and greater than or equal to 1/10. This provides considerable improvements to the aspect ratio of the inductive detector. In particular it may in certain embodiments avoid the requirement for lateral shielding.

In a further subsidiary aspect, the shield is absent about the circumference of at least one of the said first and second bodies. This configuration is particularly advantageous in terms of providing an inductive detector primarily formed of laminate components which are stacked in the orthogonal direction.

In a further subsidiary aspect, the shield is deposited or sprayed onto said insulating portion. This provides an improved chemical bond onto the insulating portion in order to avoid potentially unnecessary fasteners.

In a further subsidiary aspect, the shield incorporates a number of concentric shielding circular strips. This configuration is particularly advantageous in order to reduce the shielding material required without significantly compromising the performance of the detector.

In a further subsidiary aspect, the shield is a mesh. This configuration has been found to perform advantageously the shielding function without unduly compromising the performance of the detector.

In a further subsidiary aspect, the shield incorporates carbon granules embedded in the layer of insulating material. This configuration is particularly advantageous since it allows the conductive material to be embedded thus avoiding the potential requirement for fasteners.

In a further subsidiary aspect, the shield overlaps with at least part of the outer surface of the insulating portion of the other body. This configuration allows lateral shielding whilst at the same time allowing at least one of the electromagnetic components to be formed solely as a laminate stacked in the orthogonal direction.

In a further subsidiary aspect, the first body is constructed from a printed circuit board.

In a further subsidiary aspect, the second body is constructed from a printed circuit board.

In a further subsidiary aspect, the shield is made from a material taken from the list:

Aluminium;

Copper;

Steel;

Stainless steel.

In a further subsidiary aspect, the passive electromagnetic element is a passive resonant circuit comprising a laminar winding and capacitor in electrical series.

In a further subsidiary aspect, the laminar windings comprise a transmit winding and a receive winding.

In a subsidiary aspect, two of the laminar windings are displaced relative to each other along the measurement path.

In a further subsidiary aspect, the laminar windings are covered by an electrically insulating layer.

In a further independent aspect, the invention provides an inductive detector for measuring the position of a first body relative to a second body along a measurement path comprising: a first body which further comprises a planar surface and a passive electromagnetic target; a second body which further comprises a planar surface facing the planar surface of the first body and an arrangement of laminar windings; a third body with first and second surfaces and which extends along the measurement path and which is attached to the second body; arranged such that the distance orthogonal to the measurement path between the laminar windings and the passive electromagnetic element is less than the distance orthogonal to the measurement path between the windings and the first surface of the third body; and the distance orthogonal to the measurement path between first and second surfaces of the third body is greater than the electromagnetic skin depth at the detector's operating frequency.

Preferably, the shield is formed by using at least one of: conductive plastic mouldings, conductive printed inks or vapour phase deposition of metals. Embodiments of the invention encompass the concept of a low cost and robust detector construction which reduces the detector's susceptibility to electromagnetic noise and, in particular, from the effect of emissions from similar, nearby sensors.

BRIEF DESCRIPTION OF THE DRAWINGS

In the accompanying drawings.

DETAILED DESCRIPTION OF THE FIGURES

Figure 1:
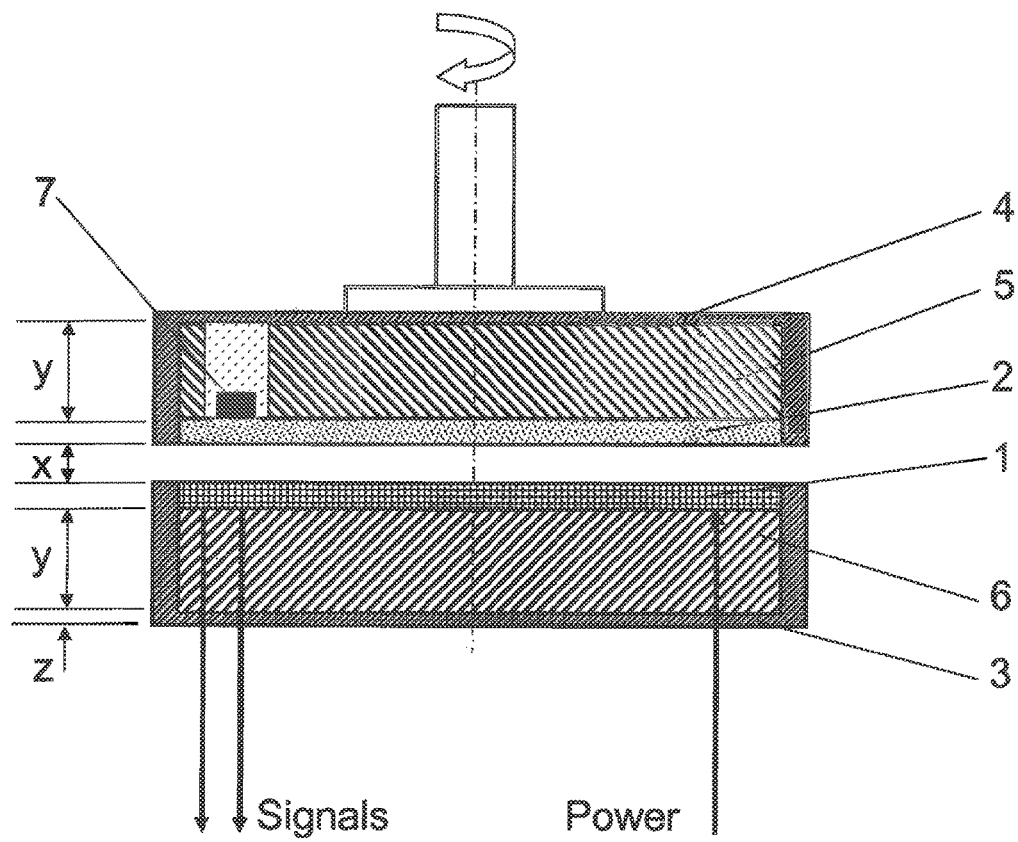
FIG. 1 shows a sectional view of a rotary detector.

FIG. 1 shows a section through an inductive rotary detector. An antenna 1 comprises a transmit winding and two receive windings embodied as tracks on a PCB. Preferably the PCB is FR4 grade with plated via holes. The transmit winding is energized with an AC signal so that it forms an electromagnetic field. An inductive target 2 is located within the field. Preferably the target 2 is a passive resonant circuit embodied as a laminar wound inductor and capacitor 7 in electrical series. The target's 2 inductor and the receive windings on the antenna 1 are arranged so that when the target rotates about its axis the mutual inductance between the transmit and receive windings varies continuously. The degree of mutual inductance between the transmit and receive windings indicates the target's 2 angle of rotation relative to the antenna 1.

The antenna 1 and target 2 PCBs are preferably backed by an insulating material 5 & 6. These layers 5 & 6 are covered on their rear faces by an aluminium carrier 3 & 4. The inner surfaces of the aluminium carrier 3 & 4 are positioned at a distance y from the detector's antenna 1 and target 2. This distance y is greater than the distance x between the antenna 1 and target 2 so that there is either no, negligible or minimal effect to the detector's measurement performance. The thickness z of the aluminium carriers 3 & 4 behind the target and windings should be sufficiently large that incoming electromagnetic noise is blocked. Preferably, the operating frequency of such detectors is in the range 100 kHz-10 MHz. In a preferred embodiment, when the lower operating frequency is 100 kHz, the skin depth of aluminium at such a frequency is roughly 0.3 mm. Accordingly, in the areas behind the antenna and target windings, the aluminium carrier should be at least 0.3 mm and preferably 0.6 mm thick in order to ensure that the detector is protected from incoming electromagnetic noise.

In an embodiment, the sides of the PCB are also covered by the carrier 3 & 4 to form a Faraday cage effect. Whilst the Faraday cage may be imperfect, the most important protection is provided against the most potentially disturbing electromagnetic noise which comes from a direction orthogonal to the plane of the target and antenna.

The carrier's 3 & 4 have a further benefit in reducing the detector's electromagnetic emissions and the influence of nearby conductive or magnetically permeable objects. Further, the carrier may be used as a barrier between neighbouring sensors to avoid 'cross talk' between sensors in close proximity interfering with each other electromagnetically.

In most instances, arrangements should be avoided whereby the shielding effect of the carrier 3 or 4 crosses between the target and antenna or interfere with the electromagnetic interaction between antenna and target. However, in some instances where environmental protection must be maximized, the carrier 3 or 4 may extend in front or between the target and antenna provided that its thickness is minimized and is substantially less than the carrier's skin depth at the detector's operating frequency. Typically this requires lower frequency operation (typically <100 kHz) and a low conductivity carrier material such as non-magnetic stainless steel in thin sheet form (typically <1 mm).

The passive electromagnetic element in the target 2 need not be a passive resonant circuit. Other elements may also be used including a metal sheet, a metal component, a ferrite sheet, a ferrite component etc.

Figure 2:
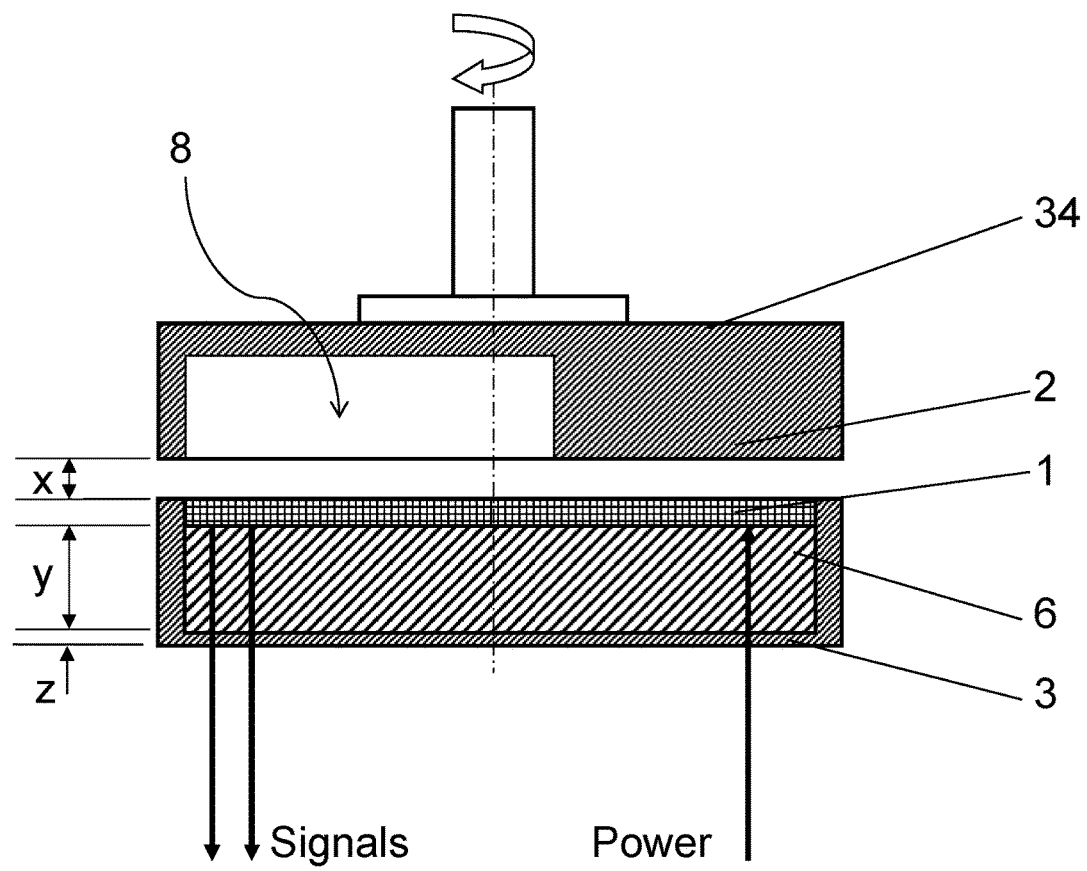
FIG. 2 shows a sectional view of an alternative construction of a rotary detector.

FIG. 2 shows a further embodiment of an inductive rotary detector comprising an antenna with transmit and receive windings and a target 2 spaced from the antenna 1 by a distance X. The target 2 may be considerably simplified when compared to the embodiment of FIG. 1 by being machined from solid material such as copper, stainless steel, conductive plastics material, aluminium. The annular shield of the previous embodiment is in effect formed by a single piece of material. The target is formed in the lower portion as indicated by arrow 2 which the upper portion forms a shield of the kind described in FIG. 1. An air gap 8 is provided on one side of the inductive component and acts as the insulating material. In the embodiment of FIG. 2, a relatively thin portion is provided alongside a relatively thick portion in order to achieve the appropriate target positioning and the shield 34 positioning desired without the complexities of the multiple components required in the prior art.

Figure 3:
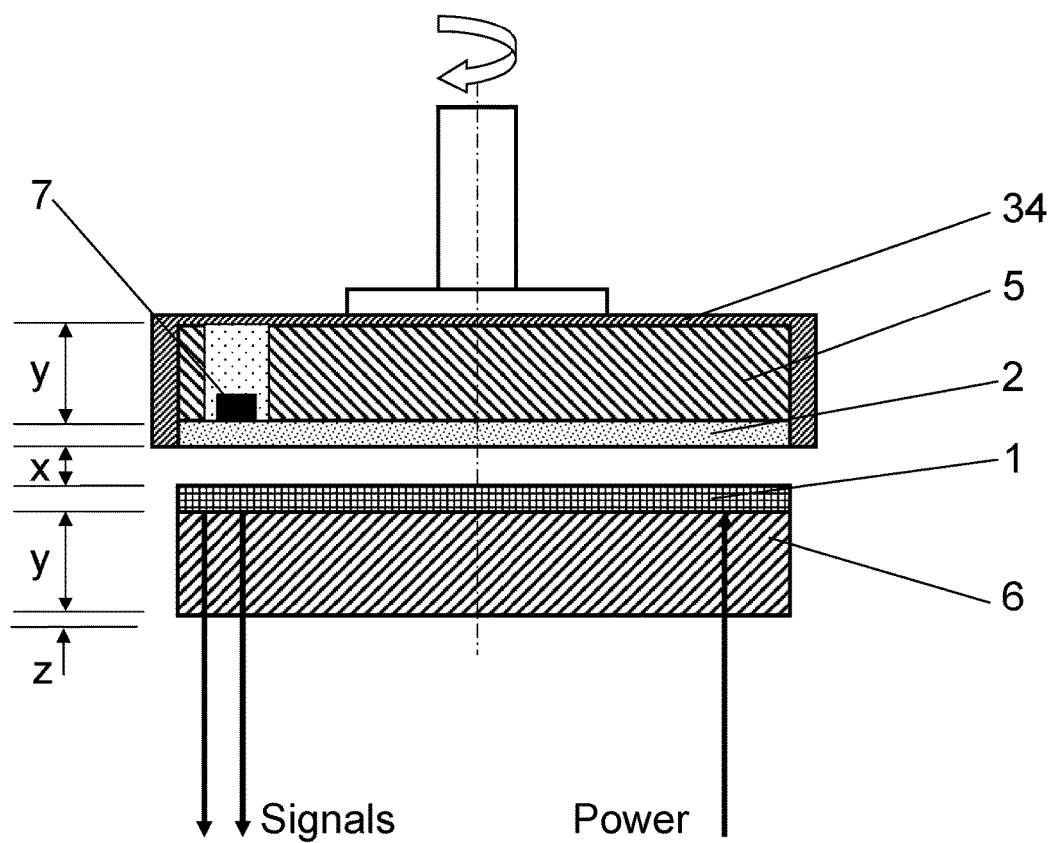
FIG. 3 shows a cross-sectional view of a further embodiment of the invention.

FIG. 3 shows a further embodiment where a first electromagnetic element 1 is located adjacent to a second electromagnetic component 2. In this embodiment, electromagnetic component 1 is the active component whilst electromagnetic component 2 is relatively passive. Behind the electromagnetic component 2 there is provided an insulating layer of material which spaces the electromagnetic component 2 from a shield 34. Shield 34 may substantially be disc shaped and located on the upper outer most surface of the insulating layer 5 and may also be located about the perimeter of the electromagnetic component. In one embodiment shield 34 may be formed by a disc shaped component and a separate annular component attached to the insulting layer 5. In a preferred embodiment, the shield may be deposited by vapour deposition onto the insulating layer and may therefore be bonded onto the insulting layer without requiring the use of separate fasteners as advocated in the prior art.

Figure 4:
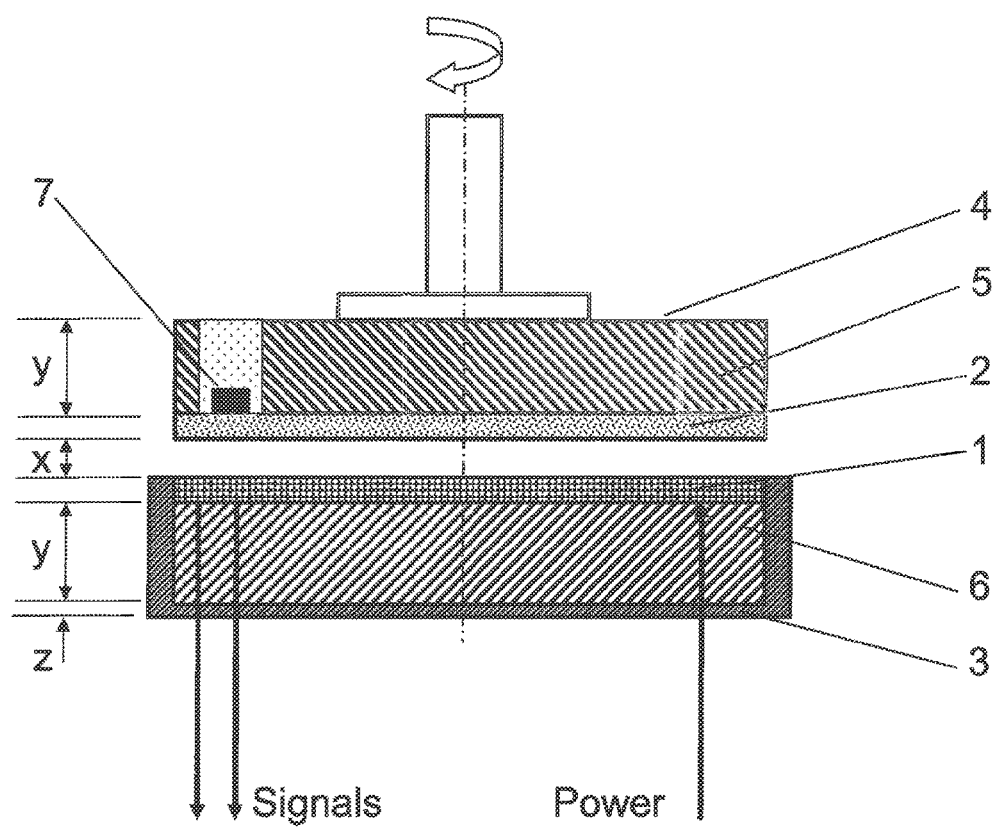
FIG. 4 shows a cross-sectional view of a further embodiment of the invention.

FIG. 4 shows the further embodiment of a detector for sensing the position of a rotatable target 2. The antenna's electromagnetic component 1 is equipped with an insulating layer 6 with an external shield 3 covering both the circumference of the component and its lower most portion. In this embodiment, advantageously only the antenna's electromagnetic component incorporates a shield whilst the rotary electromagnetic component comprises no shield.

Figure 5:
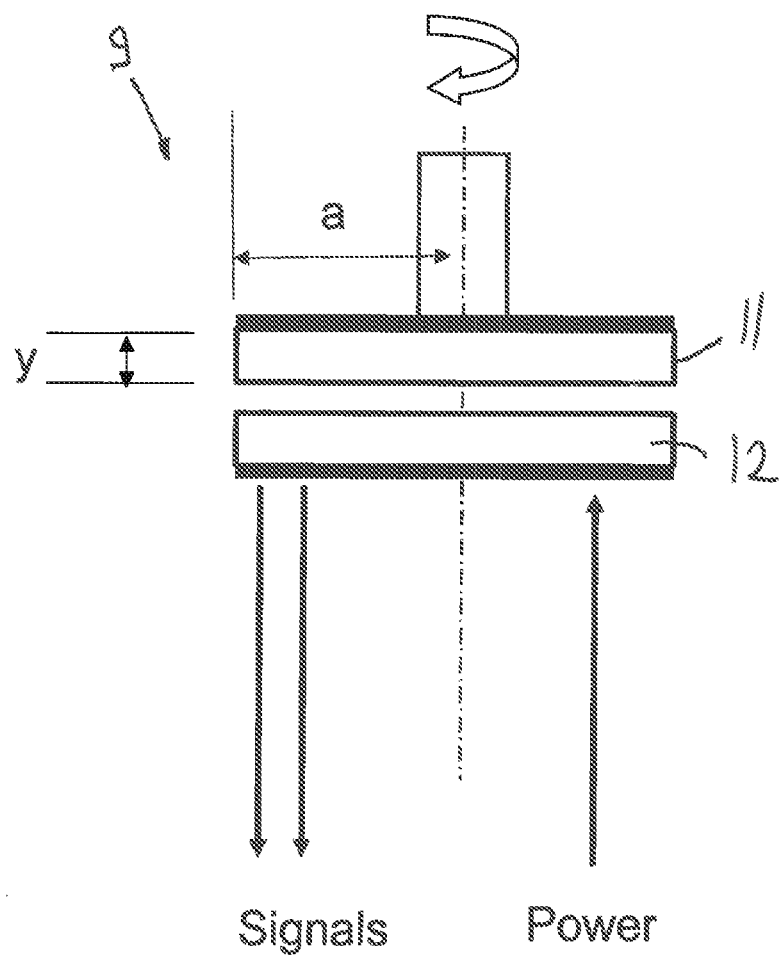
FIG. 5 shows a cross-sectional view of a further embodiment of the invention.
Figure 6:
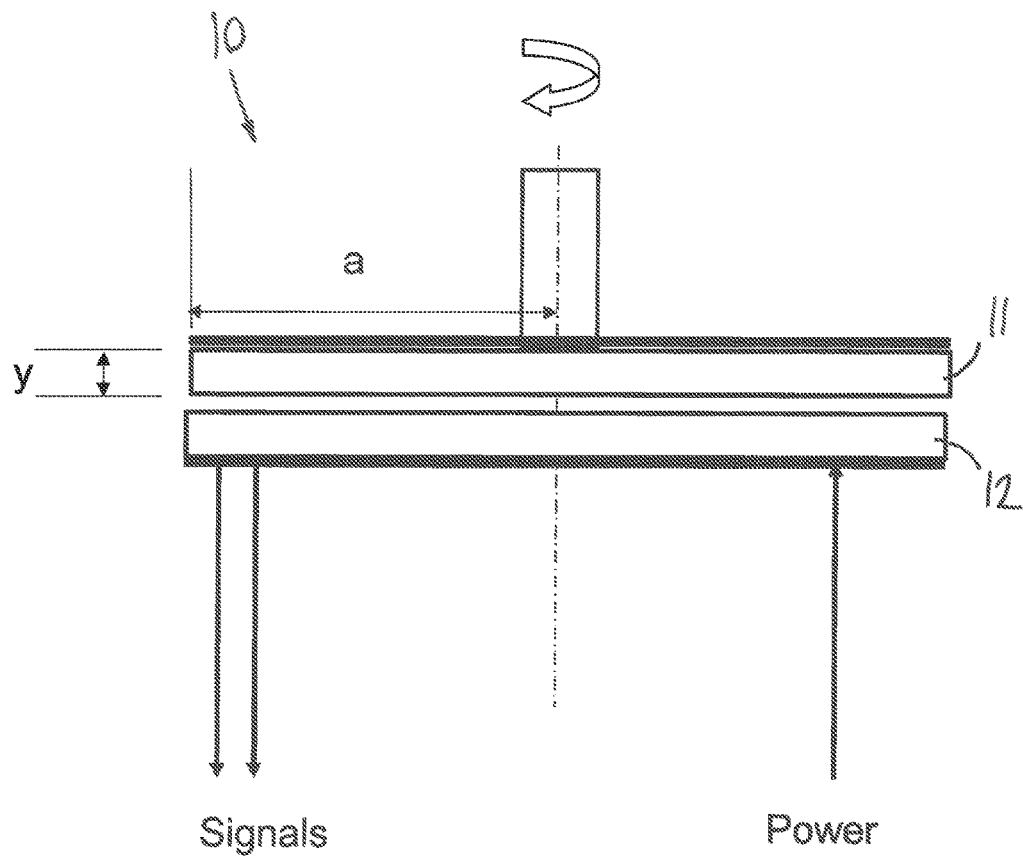
FIG. 6 shows a cross-sectional view of a further embodiment of the invention.

FIGS. 5 and 6 show further simplifying embodiments of detectors generally referenced 9 and 10. Detectors 9 and 10 comprise first and second electromagnetic components 11 and 12. In the prior art embodiments, it was found that an annular shield was necessary to achieve the desired level of shielding. In the prior art the ratio of depth (y) and a radius (a) of the electromagnetic components was approximately 0.3. Surprisingly by substantially reducing the ratio (y/a) below for example 1/5, the annular shield may be done away with in its entirety. FIG. 5 illustrates an improved embodiment where (y/a) is approximately 0.2 whilst FIG. 6 illustrates a configuration where (y/a) equals 0.12. A range of 1/5 to 1/10 avoids the requirement envisaged in the prior art of the annular shield.

Figure 7:
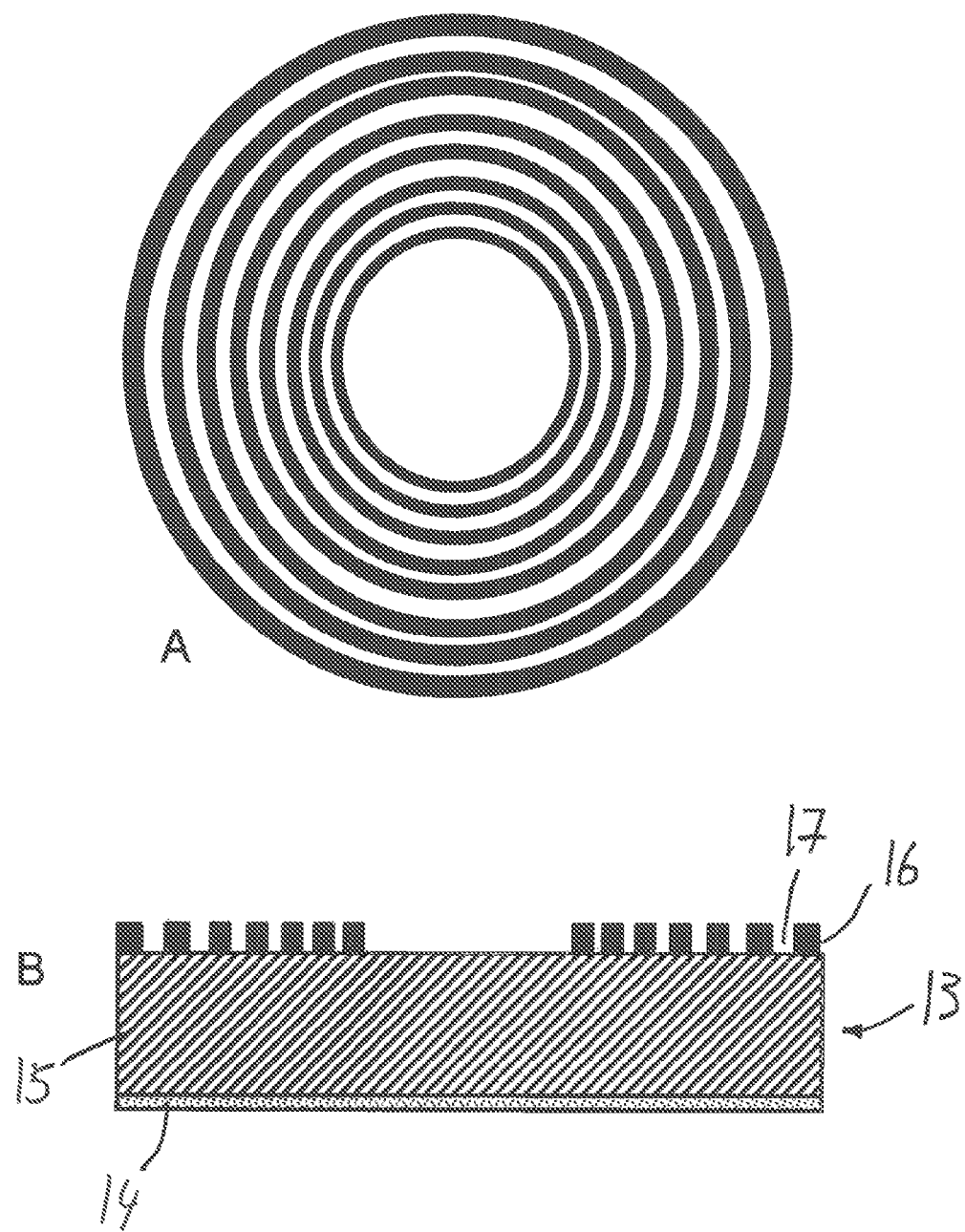
FIG. 7a shows a plan view of a shield.
FIG. 7b shows a cross-sectional view of an electromagnetic component.
Figure 8:
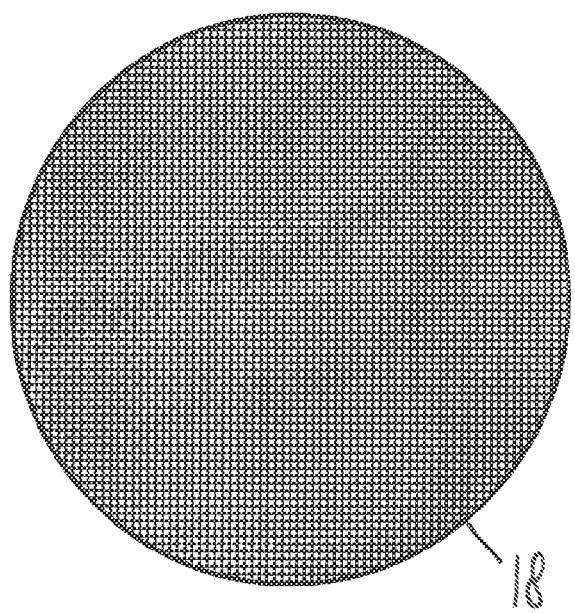
FIG. 8 shows a plan view of an alternative embodiment of a shield.

FIG. 7a shows a plan view of a shield with concentric circles of conductive material. FIG. 7b shows a further simplification of the electromagnetic component. In particular FIG. 7b shows a cross-sectional view of electromagnetic component [13] formed as a laminate of target [14], an insulating layer 15 and an array 16 of concentric circles of conductive material. This configuration introduces a series of concentric circles separated by gaps [17]. Instead of employing concentric circles, the invention also envisages the provision of strips of shielding material provided these are spaced in order to reduce the materials used for the shielding layer. A particularly efficient form of shield may be provided by a mesh such as that shown as mesh [18] in FIG. 8.

Figure 9:
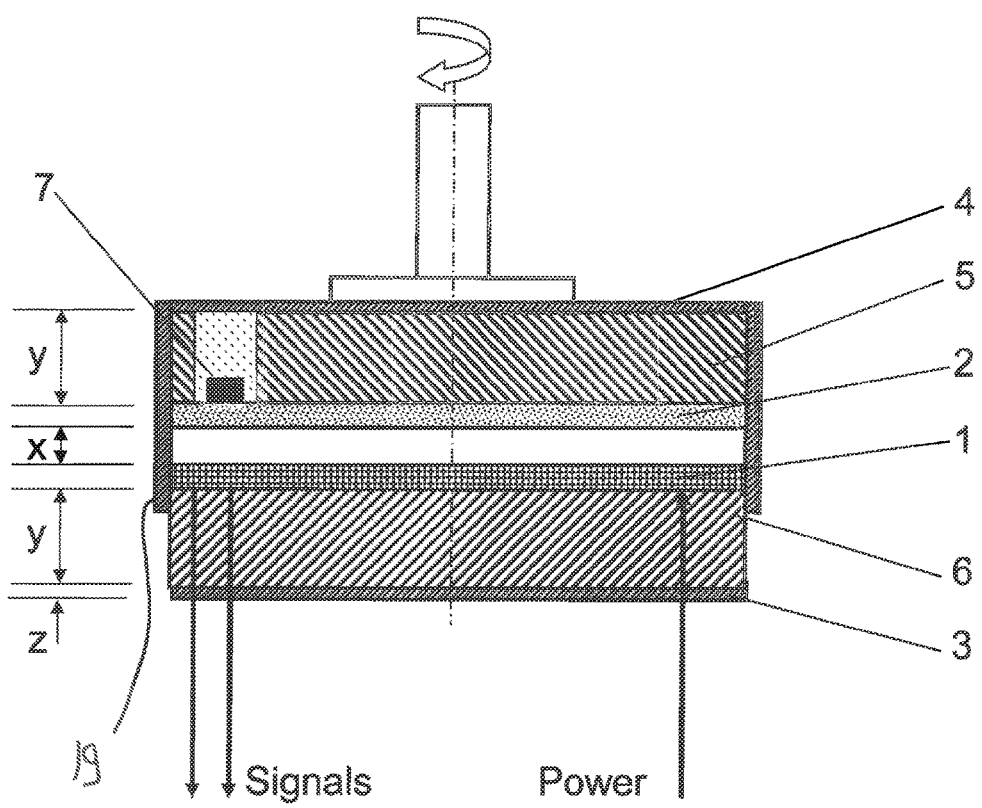
FIG. 9 shows a cross-sectional view of a further embodiment of the invention.

FIG. 9 shows a further improved embodiment of the invention where the electromagnetic component of the antenna incorporates no annular shield secured directly onto its perimeter. Instead the electromagnetic component of the target has an extended annular shield 19 which may be of sufficient length to cover the air gap between components. In a preferred embodiment as shown in the figure, the overlapping annular shield 19 may also extend around the perimeter of the antenna 1 and the upper portion of the perimeter of the insulating layer 6.

Figure 10:
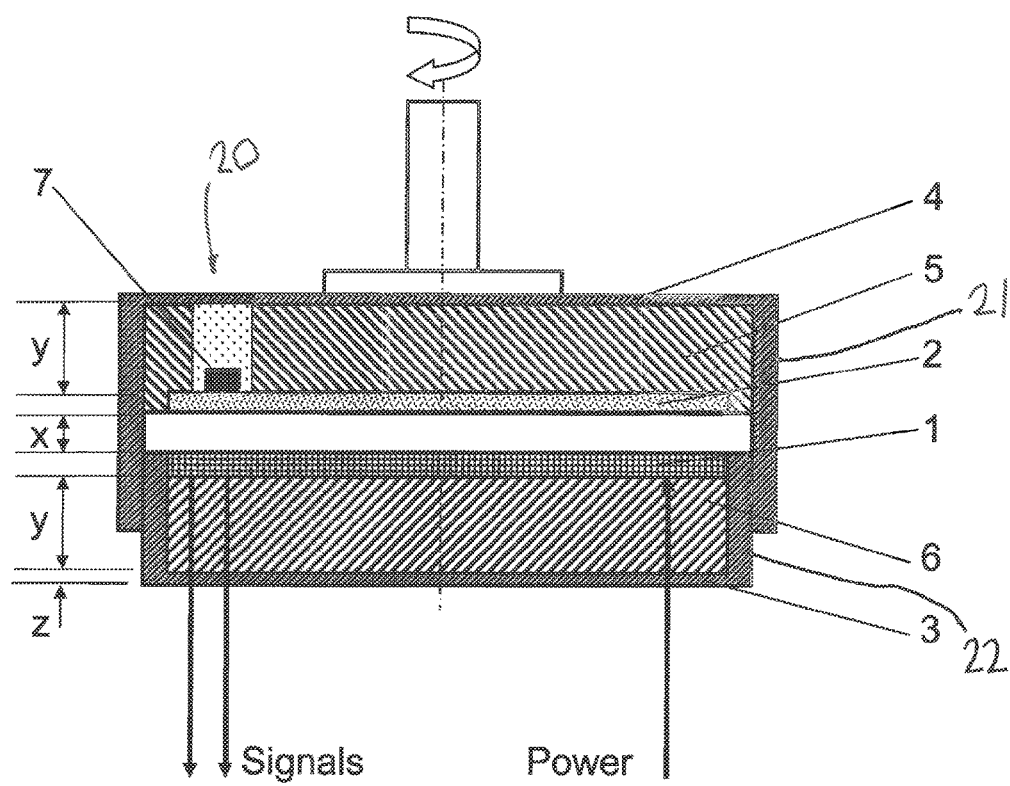
FIG. 10 shows a cross-sectional view of a further embodiment of the invention.

FIG. 10 shows a detector generally referenced 20 where both electromagnetic components incorporate annular shields 21 and 22 which are configured to overlap in order to provide a full cage effect.

Figure 11:
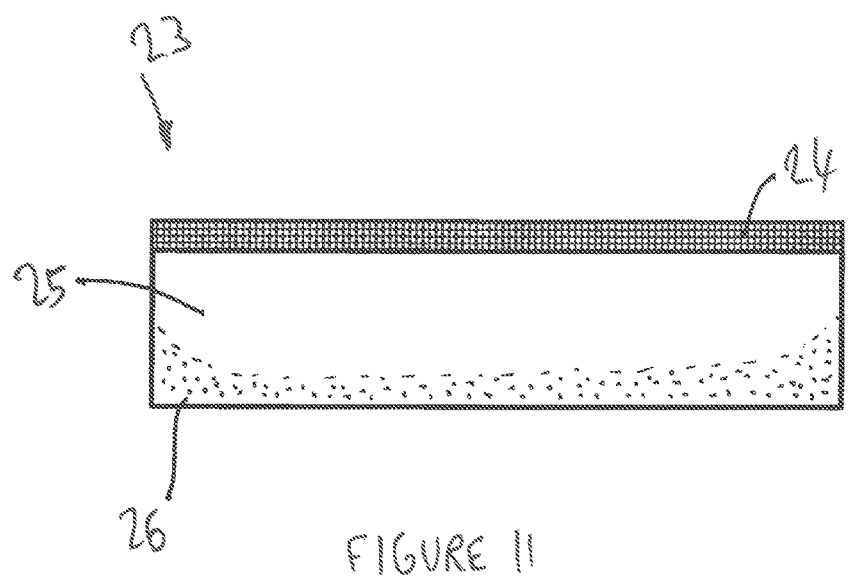
FIG. 11 shows a cross-sectional view of a further embodiment of the invention.

In a further embodiment, the electromagnetic components may incorporate a shield which is integral with the insulating layer. FIG. 11 shows an electromagnetic component 23 of a detector of the kind in question. Component 23 incorporates an antenna 24 and an insulating layer 25, a portion of layer 25 being embedded with conductive particles such as particle 26. The conductive particles may for example be carbon granules which may form an integral portion of the lower region of the insulating layer.

The shield of the various components described may be formed by placing plastics material in a mould and then at the appropriate time spraying the outside of the plastics material with material suitable for shielding the components. The material may be sprayed, evaporated or deposited in order to adhere to the insulating material layer thus avoiding the requirements for fasteners.

MODIFICATIONS AND FURTHER EMBODIMENTS

The planar surfaces of the first and second bodies need not be simple continuous planes. They may be complex planar or discontinuous surfaces.

The measurement path need not be circular. The measurement path can be various geometries linear, curvilinear, 2D etc. The invention envisages embodiments of the kind described in the figures where the configurations are modified to perform these alternative measurements.

The measured electromagnetic effect need not be a change in mutual inductance. Alternatively, the electromagnetic effect may a simple change in inductance of the antenna's 1 windings or other such electromagnetic effect.

The carriers need not be continuous. Alternatively the carriers may be formed as a mesh or a series of stripes arranged so that their electromagnetic effect approximates to a continuous lamination.

The carrier may be formed by a printed circuit board.

The carrier may or may not be earthed; may or may not carry a current or have a voltage applied to it.

The carrier may or may not have a function other than its electromagnetic shielding function.

The imperfect nature of the Faraday cage effect may be reduced by the use of overlapping lips or flanges around the periphery of the device in order to block any incoming electromagnetic energy.

The invention claimed is:

1. An inductive detector for measuring the position of a first body relative to a second body along a measurement path comprising:
   a first body which comprises a substantially planar surface; said substantially planar surface comprising a passive electromagnetic target;
   a second body which comprises a substantially planar surface facing said planar surface of said first body; said substantially planar surface of said second body incorporating an arrangement of laminar windings; said substantially planar surface of said second body being separated from said substantially planar surface of said first body by a distance X;
   said first and second bodies being configured such that the electromagnetic influence of the first body on the second body varies according to the position of the first body relative to the second body along the measurement path;

wherein said first body comprises a first portion incorporating said planar surface and a second portion recessed relative to the substantially planar surface of said first body and having a layer of thickness which is lower than the thickness of said first portion to form a gap for insulating material; said second portion acting as a shield; said first portion and said second portion of said first body being formed by a single piece of material; said second portion being adjacent to said first portion.

2. An inductive detector according to claim 1, wherein said second body incorporates a shield.

3. An inductive detector according to claim 2, wherein said second body incorporates an insulating portion and a shield; said shield being chemically secured to said insulating portion; and said insulating portion being located between said arrangement of laminar windings and said shield.

4. An inductive detector according to claim 2, wherein said second body incorporates an insulating portion and a shield; wherein said shield incorporates both conductive portions and air gaps between conductive portions.

5. An inductive detector according to claim 2, wherein said second body incorporates an insulating portion and a shield; wherein said shield is embedded into an outermost portion of said insulating portion.

6. An inductive detector according to claim 2, wherein said second body incorporates a shield and an insulating portion; said shield being deposited or sprayed onto said insulating portion.

7. An inductive detector according to claim 2, wherein said shield incorporates a number of concentric shielding circular strips.

8. An inductive detector according to claim 2, wherein said shield is a mesh.

9. An inductive detector according to claim 2, wherein said second body incorporates a shield and an insulating portion formed as a layer of insulating material; said shield incorporating carbon granules embedded in said layer of insulating material.

10. An inductive detector according to claim 1, wherein said first body is formed as a solid piece of material.

11. An inductive detector according to claim 1, wherein said gap is an air gap.

12. An inductive detector according to claim 1, wherein said second body incorporates an insulating portion and a shield; wherein the ratio of the thickness of the insulating portion and the radius of the second body is lower than 1/5.

13. An inductive detector according to claim 12, wherein the ratio of the thickness of the insulating portion and the radius of the second body is lower than 1/5 and greater than or equal to 1/10.

14. An inductive detector according to claim 13, wherein said second body incorporates an insulating portion and a shield; wherein said shield extends solely in a direction orthogonal to the measurement path.

15. An inductive detector according to claim 1, wherein said second body incorporates an insulating portion and a shield with a first and a second surface; said inductive detector being arranged such that the distance orthogonal to the measurement path between the laminar windings and the passive electromagnetic target is less than the distance orthogonal to the measurement path between the laminar windings and the first surface of the shield; and the distance orthogonal to the measurement path between the first and second surfaces of the shield is greater than its electromagnetic skin depth at the inductive detector's operating frequency.

16. An inductive detector according to claim 1, wherein said second body is constructed from a printed circuit board.

17. An inductive detector according to claim 1, wherein said second body comprises a shield which is made from a material taken from the list: aluminum; copper; steel; stainless steel.

18. An inductive detector according to claim 1, wherein the laminar windings comprise a transmit winding and a receive winding.

19. An inductive detector according to claim 1, wherein two of the laminar windings are displaced relative to each other along the measurement path.

20. An inductive detector according to claim 1, wherein the laminar windings are covered by an electrically insulating layer.

21. An inductive detector for measuring the position of a first body relative to a second body along a measurement path comprising:
a first body which comprises a substantially planar surface and a passive electromagnetic target;
a second body which comprises a substantially planar surface facing the substantially planar surface of the first body and an arrangement of laminar windings;
said first and second bodies being configured such that the electromagnetic influence of the first body on the second body varies according to the position of the first body relative to the second body along the measurement path;
at least one of said first and second bodies incorporating an insulating portion and a shield;
wherein the ratio of the thickness of the insulating portion and the radius of either the first or the second body is lower than 1/5; and said shield extends solely in a direction orthogonal to the measurement path.

22. An inductive detector according to claim 21, wherein said shield is chemically secured to said insulating portion.

23. An inductive detector according to claim 21, wherein said shield incorporates both conductive portions and air gaps between conductive portions.

24. An inductive detector according to claim 21, wherein said shield is embedded into an outermost portion of said insulating portion.

25. An inductive detector according to claim 21, wherein said shield incorporates an annular portion which projects from one of said bodies and radially covers a gap between the first and second bodies.

26. An inductive detector for measuring the position of a first body relative to a second body along a measurement path comprising:
a first body which comprises a substantially planar surface and a passive electromagnetic target;
a second body which comprises a substantially planar surface facing the planar surface of the first body and an arrangement of laminar windings;
said first and second bodies being configured such that the electromagnetic influence of the first body on the second body varies according to the position of the first body relative to the second body along the measurement path;
at least one of said first and second bodies incorporating a shield;
said detector being arranged such that the distance orthogonal to the measurement path between the laminar windings and the passive electromagnetic target is less than the distance orthogonal to the measurement path between the windings and a first surface of the shield; and the distance orthogonal to the measurement path between the first surface and a second surface of the shield is greater than its electromagnetic skin depth at the detector's operating frequency.

* * * * *